Dec. 31, 1940.  P. JEPSON  2,226,664
FRUIT HANDLING AND TREATING MACHINE
Filed Nov. 9, 1938  10 Sheets-Sheet 5

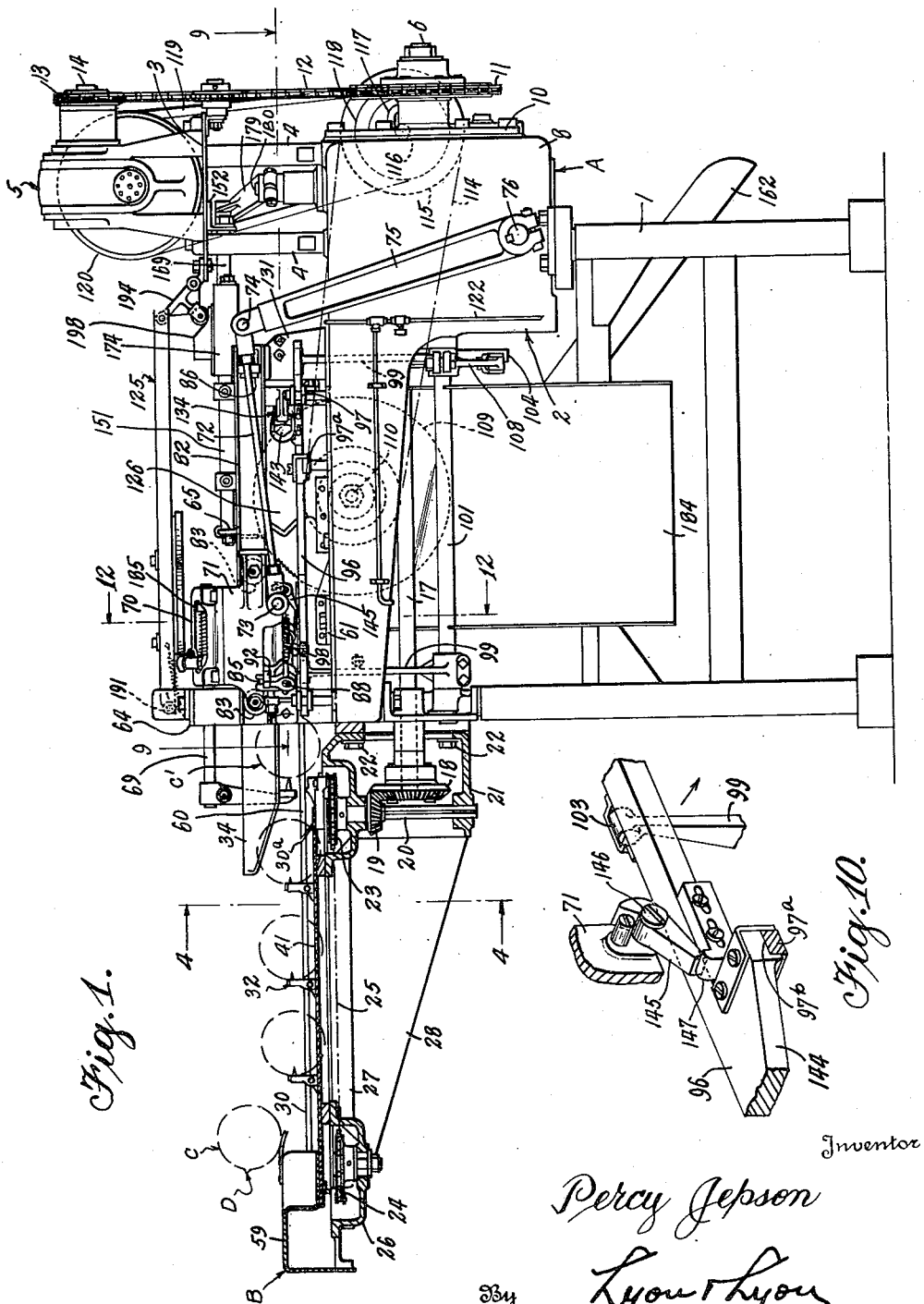

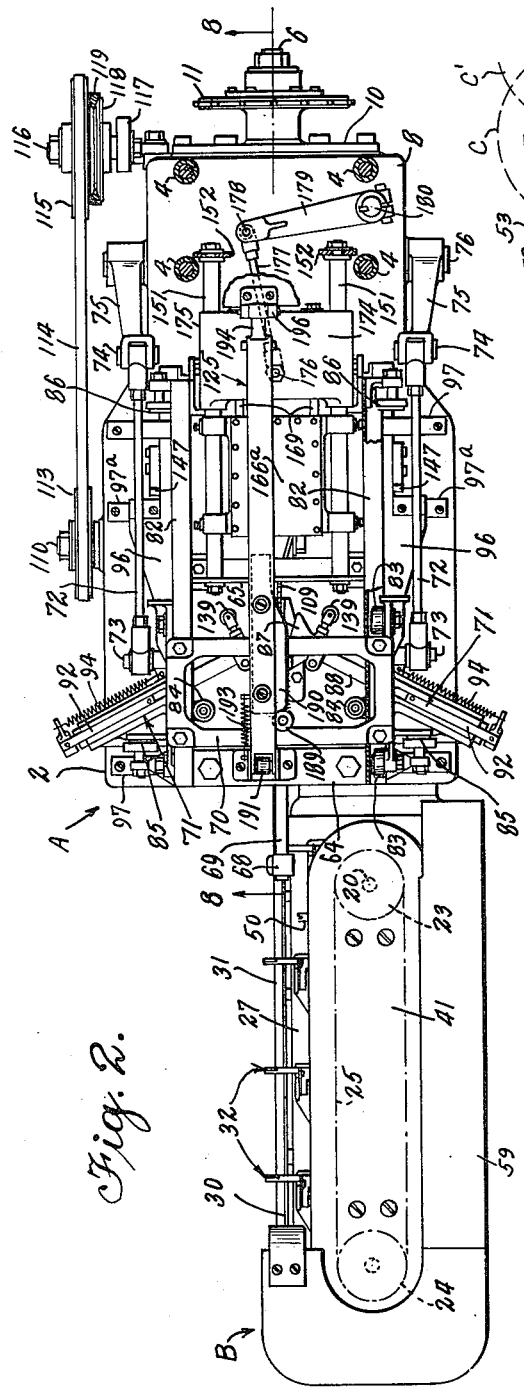
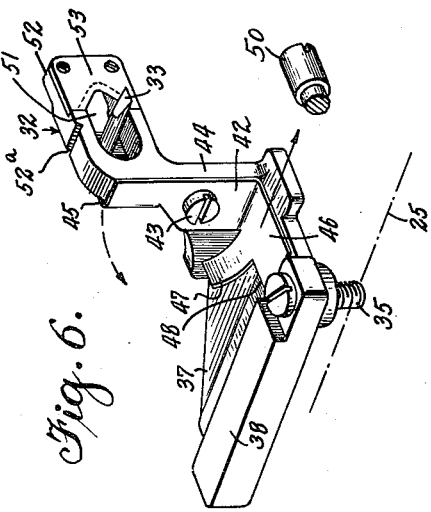

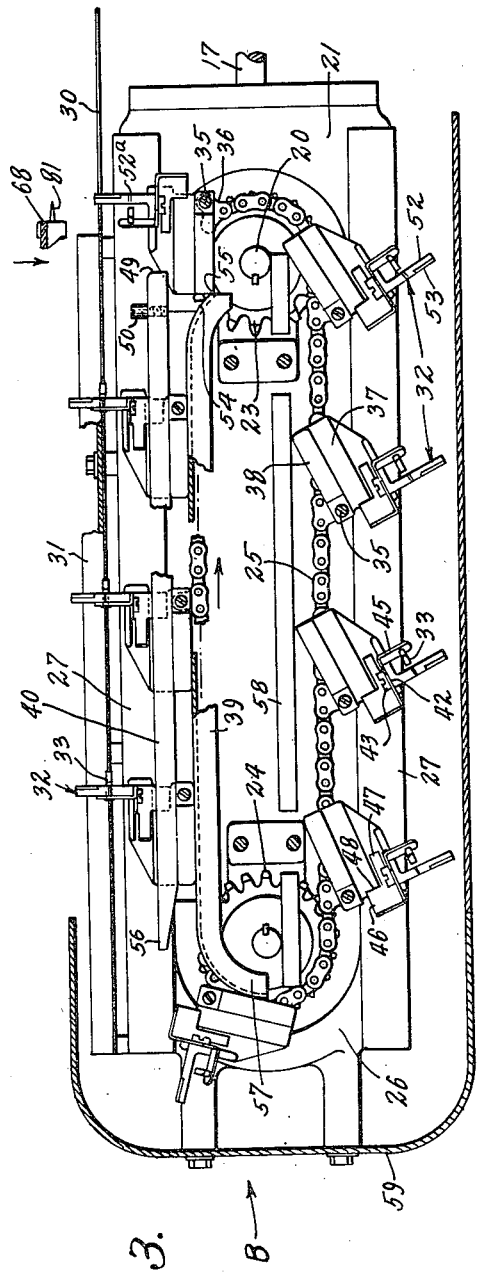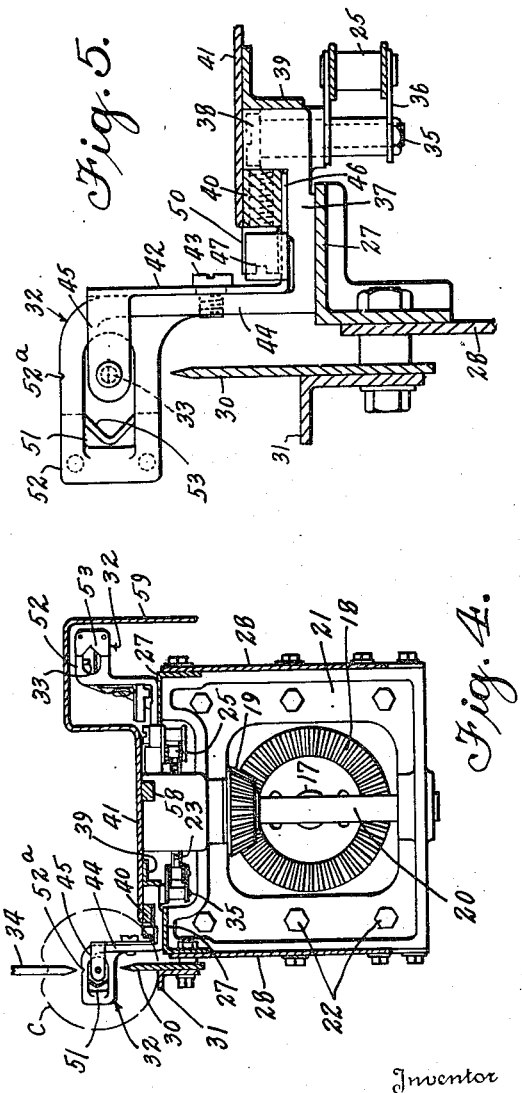

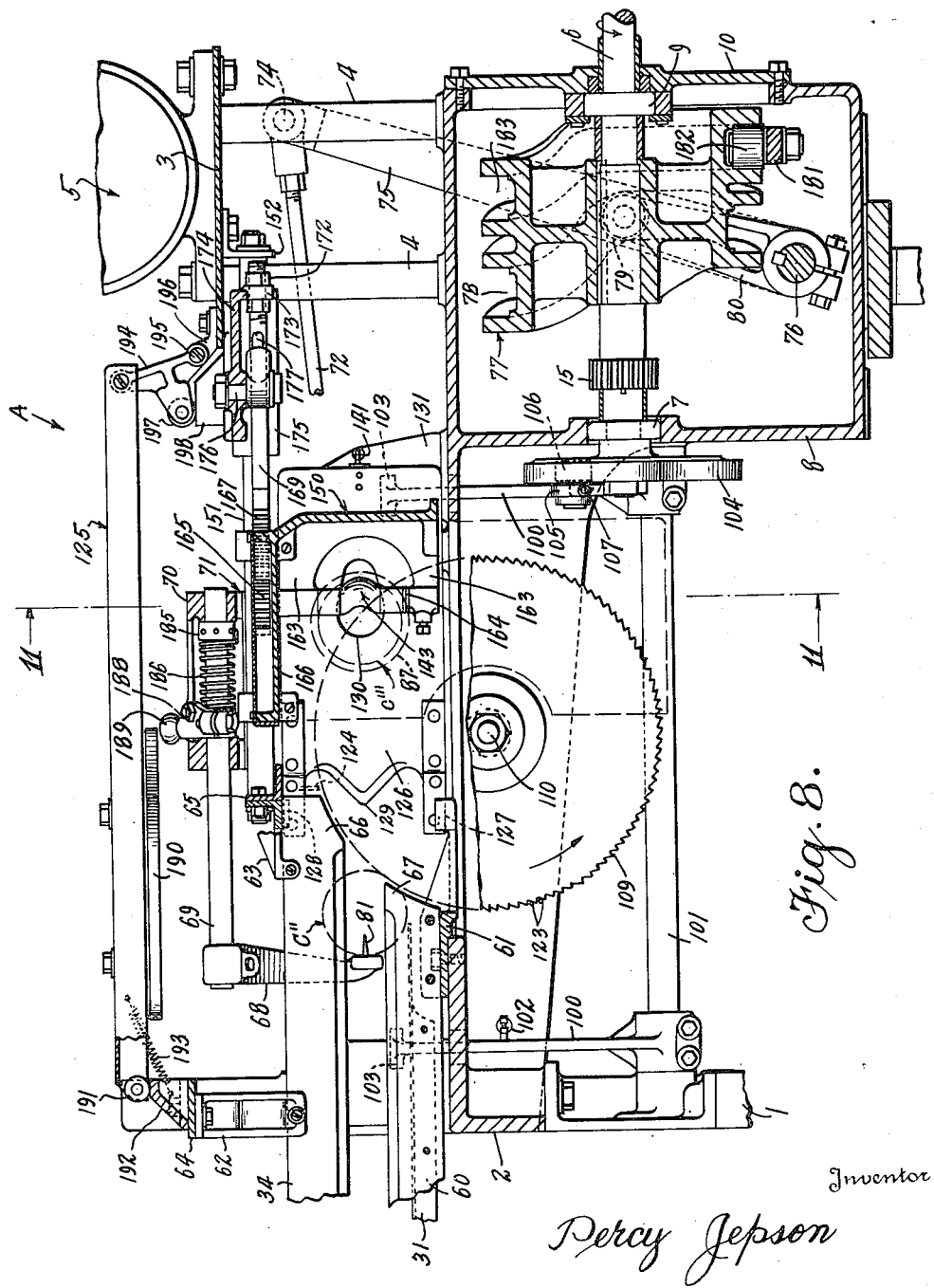

Inventor
Percy Jepson
By Lyon & Lyon
Attorneys

Dec. 31, 1940. P. JEPSON 2,226,664
FRUIT HANDLING AND TREATING MACHINE
Filed Nov. 9, 1938 10 Sheets-Sheet 7

Inventor
Percy Jepson
By Lyon & Lyon
Attorneys

Dec. 31, 1940.  P. JEPSON  2,226,664
FRUIT HANDLING AND TREATING MACHINE
Filed Nov. 9, 1938  10 Sheets-Sheet 8
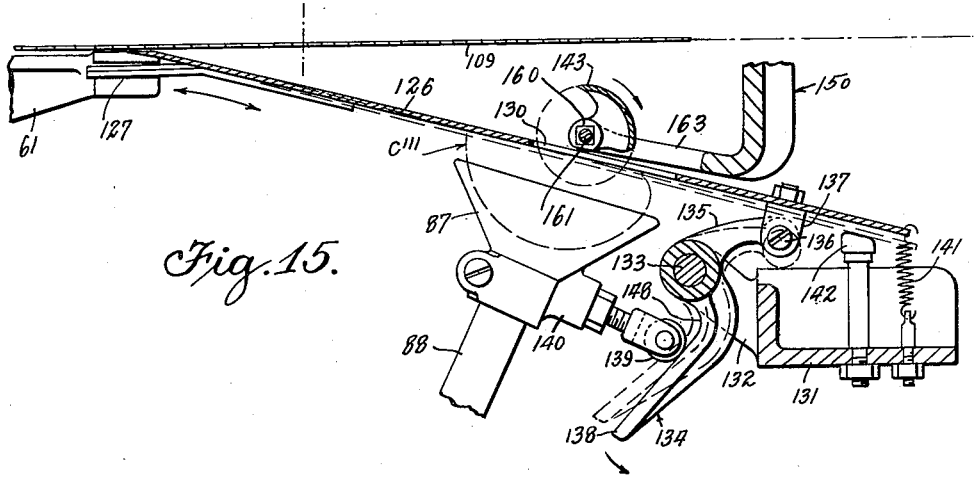
Fig. 15.
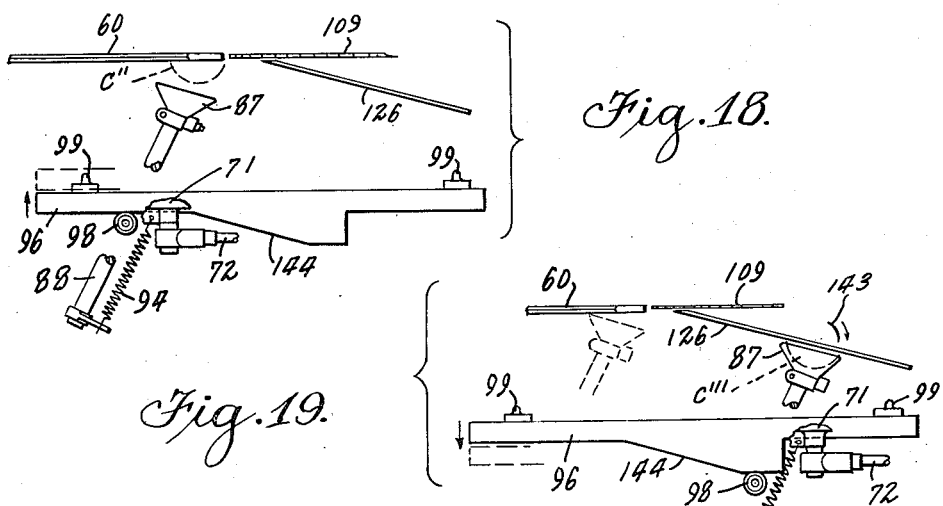
Fig. 18.
Fig. 19.
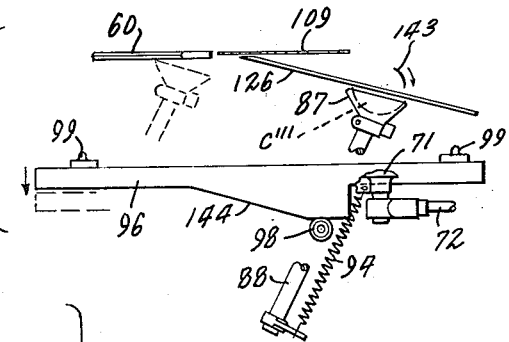
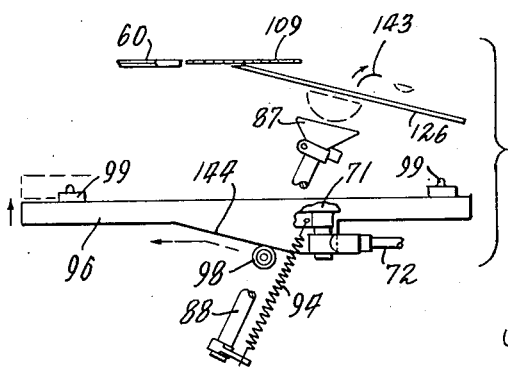
Fig. 20.
Inventor
Percy Jepson
By Lyon & Lyon
Attorneys Dec. 31, 1940.  P. JEPSON  2,226,664
FRUIT HANDLING AND TREATING MACHINE
Filed Nov. 9, 1938   10 Sheets-Sheet 9

Inventor
Percy Jepson
By Lyon & Lyon
Attorneys

Dec. 31, 1940.   P. JEPSON   2,226,664

FRUIT HANDLING AND TREATING MACHINE

Filed Nov. 9, 1938   10 Sheets-Sheet 10

Inventor
Percy Jepson
By Lyon & Lyon
Attorneys

Patented Dec. 31, 1940

2,226,664

UNITED STATES PATENT OFFICE 2,226,664

FRUIT HANDLING AND TREATING MACHINE

Percy Jepson, San Francisco, Calif., assignor to Pacific Machinery Company, San Francisco, Calif., a corporation of California Application November 9, 1938, Serial No. 239,664

9 Claims. (Cl. 146—28)

This invention relates to a fruit handling and treating machine and may be regarded as an improvement on the fruit treating machine disclosed in my copending application, Serial No. 213,604, filed June 14, 1938.

This application, as in the instance of my aforesaid mentioned copending application, relates, particularly to the treating of peaches, but is an improved type of machine and includes introductory means thereof, for the more efficient and economical handling and treating of peaches.

In order to more successfully accomplish the treating of peaches, and the removal of the pits therefrom, a machine for this purpose must be efficient and capable of operating at a high rate of speed and should include certain loading and introductory means for the fruit which will permit the continuous operation of such a machine and loader.

It has been demonstrated during previous seasons that such a machine will handle relatively larger quantities of peaches than the types of fruit treating machines formerly employed, and at a higher percentage of efficiency.

The principal object of this invention, therefore, is to provide a peach treating machine, loading, and introductory means, which are continuously and simultaneously operated, whereby the fruit may be more efficiently introduced to the treating machine and therein more successfully treated than in former types of fruit treating machines.

A further object of this invention is to successfully introduce peaches into a treating machine wherein the peaches are cleanly and accurately cut into halves, the pit cleanly and accurately removed therefrom without damage to the meat of the fruit, regardless of the varying size and shape of either the peach or its pit; the machine to run continuously throughout its cycle of operations, each accurately co-ordinated with the several successive steps in the treating of the fruit; and the operating elements of the machine must be so designed that they naturally adapt themselves to free and clingstone peaches and especially the split-pit peaches which often constitute a large percentage of the clingstone variety.

Other objects of the invention are to provide a continuously operated loading means which will function in timed relation to the fruit treating machine; to provide said loading means with an impaling blade for receiving the peaches and accurately registering them relative to their pits; to provide means for transferring the peaches along the impaling blade and maintaining them in a fixed relation thereto; to provide a means for automatically removing the tip of the peach prior to its introduction into the fruit treating machine; and to provide means for introducing the peach in this pre-determined position into the treating machine in proper timed relation thereto; to provide a continuously operated fruit treating machine with a receiving means, comprising an impaling blade, a transfer and fruit engaging means movable along an axis angularly relating to the plane of the impaling blade, whereby fruit delivered thereto in a pre-determined position, whether relatively large or small, is thus maintained while it is conveyed through the machine where it is halved during its progress to the pitting position, at which position the pits are cleanly and accurately removed, and with the least possible loss of edible meat cut from the fruit during this operation; to provide means for correctly locating the bisected peach, regardless of irregularity of size or shape, at substantially the proper position for pitting; to provide an improved floating pitting plate to accommodate such different size fruit, said pitting plate having an orifice therein so formed as to aid in the pitting of the fruit and also in the discharge of the removed pits regardless of their varying shape or size; to provide means for automatically registering the floating pitting plate with the pitting knives, whereby the edge of the orifice in the pitting plate aligns itself to serve as a shear plate in co-operation with a rotary pitting-knife; to provide a pair of adjustable rotary pitting knives, one for each half of the peach, each mounted on a single shaft which is relieved at its mid portion to co-operate with the orifice in the pitting plate, thereby to aid in the discharge of the removed pits; to provide a practical method of discharging the peach halves after the removal of the pits therefrom; and to provide a fruit treating machine of the character above described, that will operate continuously, efficiently and smoothly at a high rate of speed and over long, uninterrupted periods of time.

These and other objects of the invention will be apparent from the accompanying drawings and the detailed description thereof, wherein is illustrated a preferred embodiment of the invention.

In the drawings:

Fig. 1 is an elevational view, illustrating the right hand side of the machine, combined with the loader (which is represented in section), as the same would appear at the moment of receiving the fruit at the start of a cycle.

Fig. 2 is a plan view thereof, with the motor and its support removed.

Fig. 3 is an enlarged plan view illustrating the loader, with its cover plate and guard removed.

Fig. 4 is an enlarged vertical section of the loader, taken on line 4—4 of Fig. 1.

Fig. 5 is an enlarged, fragmental portion of Fig. 4 illustrating one of the feeder elements.

Fig. 6 is a perspective view of one of the feeder elements.

Fig. 7 is a diagrammatic view illustrating the method of removing the tip of a peach.

Fig. 8 is an enlarged longitudinal section of the machine, illustrating certain elements at the pitting position and taken substantially on the line 8—8 of Fig. 2.

Fig. 10 is a perspective view of the cup-carriage latching means.

Fig. 15 is an enlarged detailed view, partly in section, of one of the gauging means for controlling the depth of the cut in removing a peach pit, together with its associated elements.

Figs. 18, 19, and 20 are diagrammatic views on a reduced scale, illustrating the various steps in the transfer and pitting operations of the machine.

Figure 21:
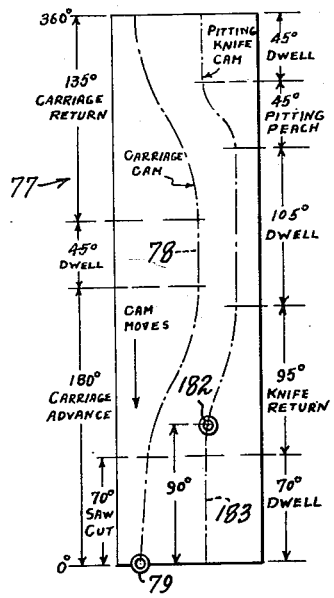

Fig. 21 is a diagram of the two cam tracks of the main operating cam and illustrating their relation to the proper timing of each function during one complete cycle of the machine.

Figure 22:
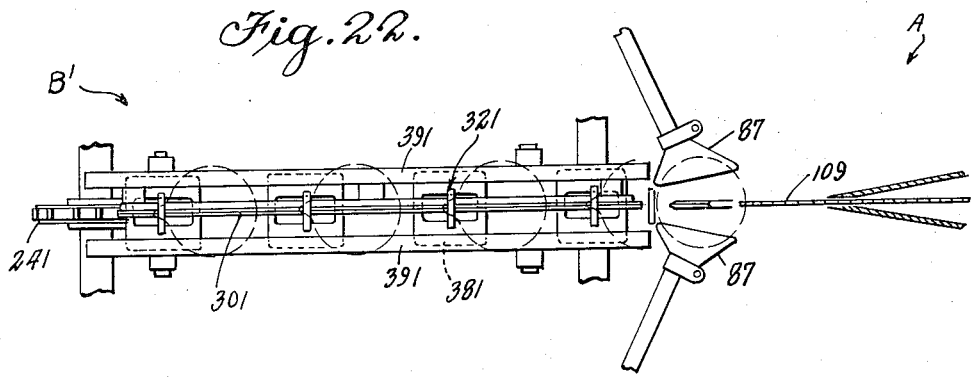

Fig. 22 diagrammatically illustrates a plan view of a modified form of a loader and introductory means.

Figure 23:
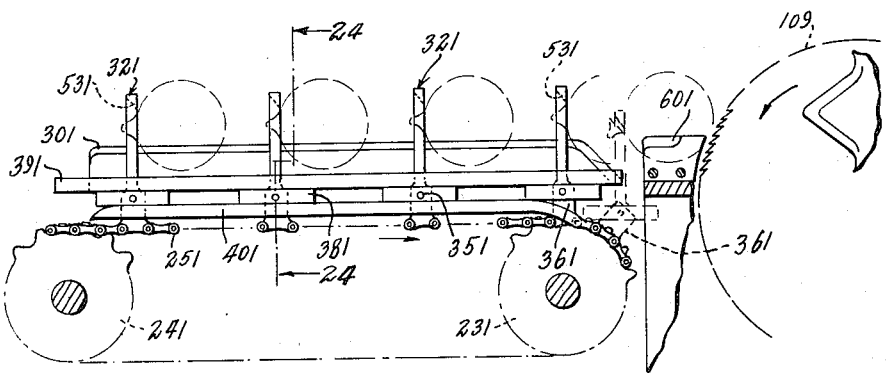

Fig. 23 is a side elevation, partly in section, of the modification illustrated in Fig. 22.

Figure 24:
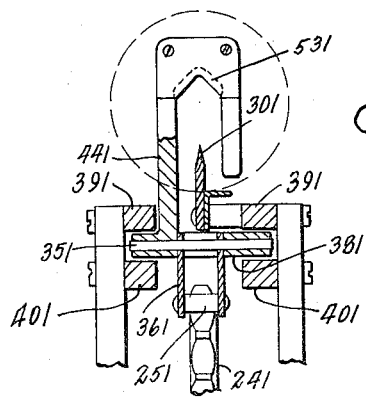

Fig. 24 is a vertical section illustrating one of the flights used in this modification, and taken susbtantially on the line 24—24 of Fig. 23.

In the preferred embodiment of this invention, there is provided a fruit treating unit A, which is generally of the type disclosed in my aforesaid copending application, Serial No. 213,604, filed June 14, 1938, but of an improved design in that it is continuously operated, and more positively treats the fruit introduced therein, together with various other improved features as will hereinafter be more fully set forth.

Mounted upon the forward end of the fruit treating unit A is a loading unit B, where the fruit is first received and the initial operation of "tipping" the peach is performed during its transfer along said loading unit prior to its introduction to the fruit treating machine proper, wherein the peach is divided into approximate halves and each half subsequently and simultaneously pitted.

The fruit treating machine A and the loading unit B may be assembled as an integral structure and supported upon a frame 1 at such suitable height for the operator, who may be seated upon a stool (not shown), to feed the fruit from a box (not shown) to the extreme forward end of the loading unit B, as indicated in Figs. 1 and 2.

The mechanism of the fruit treating unit A is assembled in a base casting 2, and supported by the frame 1. Supported on a shelf 3, sufficiently spaced above the top surface of the base 2 by posts 4, is a motor and gear reducing assembly 5. Power for all of the moving members of both the units A and B is supplied by this motor assembly 5. The main power shaft 6, of the fruit treating unit A, is of relatively short length, and is supported near its forward end in a bearing 7 (Fig. 8) mounted in a housing 8 formed as a part of the machine base 2, and is supported near its rear end in a bearing 9 carried by the cover plate 10.

A sprocket 11 (Fig. 1), secured to the outer end of shaft 6, is connected by the chain 12 with a sprocket 13 which is mounted on the end of the reduction gear shaft 14. This drive assembly causes the main shaft 6 to be driven at a relatively slow speed and in a counter-clockwise direction as viewed from the rear of the machine (right hand end, Figs. 1 and 2).

Figure 9:
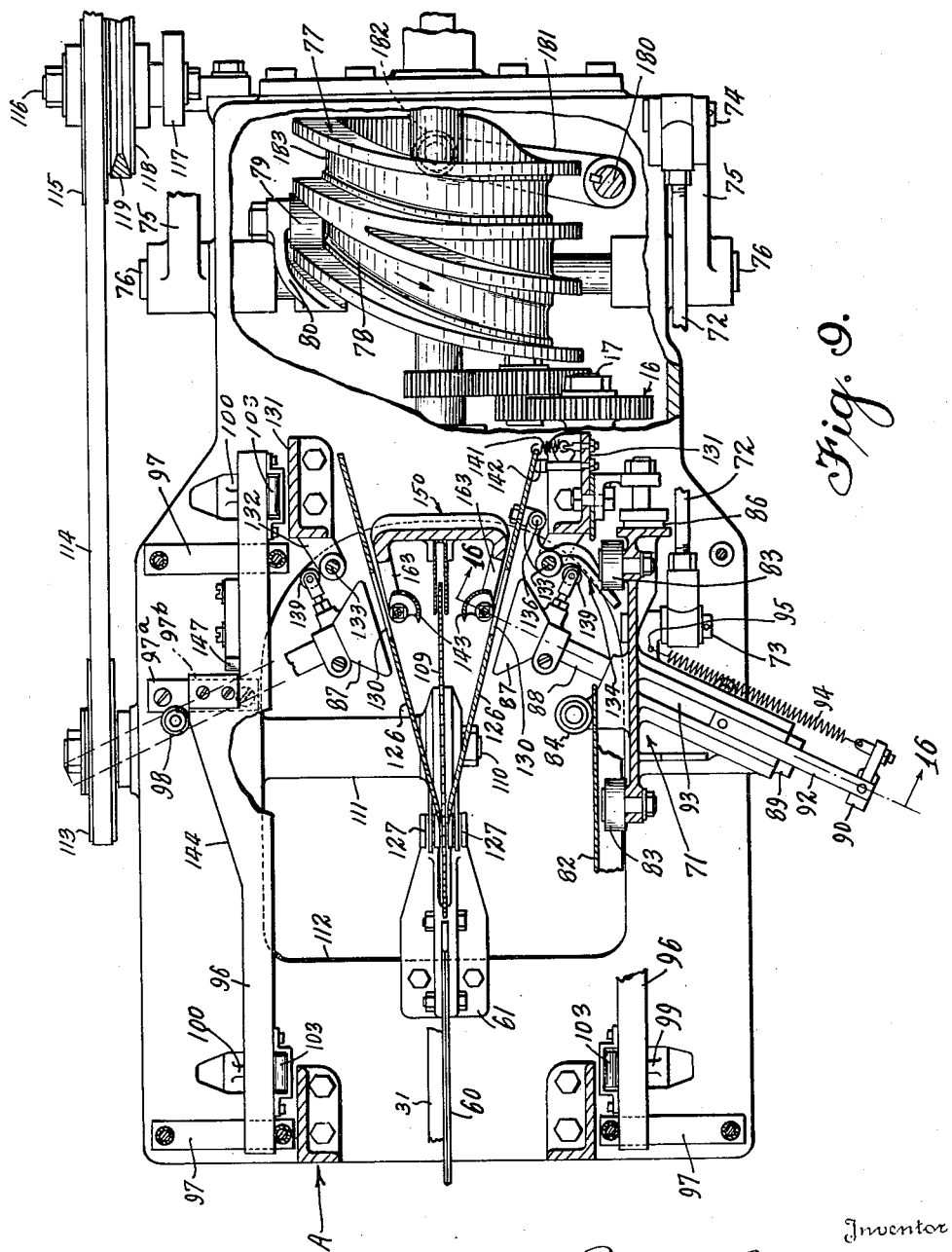
Fig. 9 is an enlarged plan section, illustrating the machine at the pitting position, a certain portion being broken away to disclose other operating elements, and it is taken substantially on the line 9—9 of Fig. 1.

A pinion 15 (Figs. 8, 9), is secured on the shaft 6 near its forward end and, through suitable gear take-off means 16, drives the counter shaft 17 (Figs. 1, 9). This counter shaft 17 is mounted in suitable bearings below the forward portion of the machine and is preferably driven at approximately the same speed, and in the same direction of rotation as the shaft 6.

On the forward end of the shaft 17 (Fig. 1), is secured a beveled gear 18 meshing with a beveled gear 19 splined to a vertical shaft 20 and supported in a rear frame member 21 which forms part of the supporting structure of the loading unit B, said rear frame member 21 being rigidly secured, as at 22, to the forward end of the frame 2 of the fruit treating unit A.

The loading unit B is designed generally, in the nature of an endless chain conveyor, and comprises spaced apart sprockets 23 and 24, having equal pitch diameters, and connected by the chain 25. The drive sprocket 23 is secured to the upper end of the vertical shaft 20 and the sprocket 24 is rotably supported in a forward frame member 26, these frame members 21 and 26 being rigidly connected in their properly spaced relation, by side frame members 27. Skirt portions 28, serve as additional bracing means for the entire structure of the loading unit B.

In the operation of the machine, the fruit C may be preferably but not necessarily sorted as to size and grade, and is supplied to the extreme forward end of the loading unit B, care being taken to have the tip D of the peach towards the operator, or at the back of the peach as it moves in the direction of the machine A; and care should also be taken to position the groove or suture of the peach along its uppermost side.

The peach is placed on the impaling blade 30 in this manner, with the plane of the blade in line with the suture of the peach. The impaling blade 30 (Figs. 1, 3 and 5), is sharpened along its upper edge to facilitate the impaling of the peach thereon. A guide member 31, of angular cross section (Figs. 4 and 5), may be adjustably secured to the impaling blade 30 to predetermine the depth to which the peach is impaled thereon, such depth being approximately the average distance from the surface of the fruit to the surface of its pit. In the instance of peaches having split pits it is obvious that the impaling depth, determined in this manner, will prevent the fruit which have split pits from completely passing across the blade thereby saving the operator possible injury, also from further damaging the fruit, and at the same time positioning the peach in proper alignment for its subsequent treatment.

The impaling blade 30 and its guide member 31 are secured to the inner face of the loading unit B in such manner that the plane of the blade is co-incident with the center line of the body of the fruit treating unit A.

Secured at regularly spaced intervals to the sprocket chain 25 are offset feeding members 32, and hereinafter referred to as "flights" (see Figs. 2, 3, 4, 5, and 6). These flights are so spaced and the conveyor drive sprocket speed so timed as to present one peach to the receiving means on the machine A for each complete operating cycle of said machine.

As the flight 32 comes around the impaled peach C, a retractable pin 33 engages the peach at its tip which is at the approximate center of the peach, thus further impaling the peach to prevent its rotation about the impaling blade 30 during its transfer period. Peaches are successively impaled and transferred in this manner to a section of the blade near the rearward end of the loader where, secured to the upper frame structure of the treating unit A, a second sharpened impaling blade 34, spaced above, and in the same plane as the lower blade 30, impales itself in the top portion of the peach. These two impaling blades, 30 and 34, are spaced apart a distance equal to the approximate width of a peach pit, and thus partially cut the fruit, which will be completed at the time of the bisecting operation.

The flights 32 are pivotally connected as at 35 (Figs. 5 and 6), to suitable extensions 36 of certain of the links comprising the sprocket chain 25. The base portion 37 of each flight has an elongated upstanding section 38 which serves to maintain the flight in axial alignment with the impaling blade 30 during its peach conveying period, this section 38 being guided between downwardly extending rails or guide-bars 39 and 40 which are secured to the under side of a cover plate 41, said cover plate being fastened to the top surfaces of the loading unit frame members 21 and 26.

An oscillatory offset plate 42 (Figs. 5 and 6), is pivoted as at 43 to the upright portion 44 of each flight 32 and an upper outwardly offset portion 45 of the member 42 carries the retractable aligning pin 33, said pin being exactly in line with the plane of the impaling blades 30 and 34 and approximately mid way between the edges of said blades. A lower offset portion 46 of the member 42, having an upwardly extending tail portion 47 which is of narrower width than the portion 46, is caused to lie flat against the base 37 of the flight 32 by being confined in the area between the lower surface of the rail 40 and the upper surface of the base 37 of the flight 32, which area equals the thickness of the member 46; thus the oscillatory member 42 is maintained in an upright position, and the pin 33 positively held in its impaling position in the tip of the peach during the transfer period.

However, as the flight progresses to the position where the peach has impaled itself on the second impaling blade 34, the cut away portion 48 of the offset 46 passes out of engagement with the end 49 of the guide bar 40 and further progress of the conveyor chain 25 causes the extended tail portion 47 of the member 42 to engage a lug or pin 50 (Figs. 7 and 3), extending from the side of the guide bar 40, into the path of the tail portion 47, hence causing the member 42 to rotate about its pivot 43 and retracting the pin 33 from the tip of the peach. The pin 33 protrudes through a sizable opening 51 in the extension 52 of the upright portion 44 of the flight 32. A tipping knife 53 (Fig. 6), formed with a V edge, is secured to the rear side of the extension 52, and is employed as the means for removing the tip of the peach.

As the flight has now reached its limit of rearward travel and is next to pass around the sprocket 23, it performs the operation of removing the tip from the peach by virtue of causing the V knife blade 53 to execute a slicing cut as is clearly disclosed in Fig. 7. The rail 41 terminates at a relative distance from the outer periphery of the pitch diameter of the sprocket 23 and the end of the rail 39 has a curved portion 54 that is equal to the pitch diameter of sprocket 23, thus serving as a cam to engage the rounded end 55 of the upstanding portion 38 of the flight 32. As the flight continues around the sprocket 23, the tip D of the peach C is cleanly cut off as is indicated by the several dotted line positions in Fig. 7. The peach is now ready to be introduced into the fruit treating unit A, but before entering into the description of this unit, the completion of the cycle of the loading unit B will be described.

As the flight 32 continues its return around the sprockets 23 and 24, the oscillatory member 42 is held in its retracted position by the normal friction of its pivot pin 43, but as the flight passes around the inner side of the sprocket 24 prior to its contacting another peach, said member 42 is returned to its initial position, realigning the pin 33 so as to impale itself in the tip of the next succeeding peach, by virtue of the forward end 56, of the guide bar 40 intercepting the offset portion 46 of member 42 thus rotating said member 42 back to its starting position. The forward end 57 of the rail 39, likewise is curved to correspond with the periphery of the pitch diameter of the sprocket 24 and thus serves as a guide to return the up-standing portion 38 of the flight 32 between the guide bar 40 and the rail 39.

A guide bar 58 (Fig. 3), prevents the flights 32 from interfering with each other and the several structural parts of the loading unit, during their return travel.

A small notch 52ª (Figs. 5 and 6), may be formed on the top edge of the extension 52 of the flight 32, and located exactly in line with the plane of the impaling blade 30, for the purpose of assisting the operator in properly centering the fruit thereon.

A suitable housing or cover 59 (Fig. 2) may be provided for the loading unit B.

The structure and operation of the fruit treating unit A will next be described.

At the completion of the initial operation of removing the tip D, the peach has reached its limit of rearward travel along the impaling blade 30, the conveyor and feeder elements of the loading unit having passed around the sprocket 23 and returning to the receiving position.

The peach C' (Fig. 1) is now in the predetermined position to be introduced into the fruit treating machine, the structure and operation of which is so designed as to correlate with the function and timing of the loading unit B, and to complete the treating operations necessary for the fruit in a continuous and uninterrupted sequence thereof.

It will be noted that the impaling blade 30 terminates near the rearward end of the loading unit as indicated at 30ª in Fig. 1. However, the fruit treating unit A is provided with another impaling blade 60, of the same cross section as the blade 30 and in exact alignment with it, thus forming a continuation of said blade. The blade 60 is supported in bracket 61 secured to the base 2 of the machine.

The split-pit guard 31 preferably extends the entire length of the two impaling blades 30 and 60 and serves to securely maintain them in exact alignment, hence there exists a continuous impaling blade and guide from the extreme forward end of the loader to the transfer position of the fruit treating machine.

The lower impaling blade 60 and the upper impaling blade 34 terminate immediately forward of the bisecting means, hereinafter to be described.

The upper blade 34 is supported in convenient brackets 62 and 63 (Fig. 8), depending from the upper frame cross-members 64 and 65, respectively, and both of these blades 34 and 60 are preferably left unsharpened at their inner extremities, as indicated at 66 and 67, respectively, in order to slightly spread the meat of the peach so that the bisecting means may perform its function without damaging the fruit.

A pusher 68, arcuate in form to clear the upper impaling blade 34 during travel, is the means employed for introducing the peach from the loader B into the fruit treating machine A.

This pusher 68 is secured to the forward end of a rock shaft 69, rotatably supported in the cross-head 70, of a transfer carriage 71 (Figs. 1, 2, 8, 9, 11, 12 and 13).

The transfer carriage 71, in fact, comprises two units, one left-hand, and the other right-hand, each functioning on the respective sides of the machine. As they are identical in structure, with the exception of being reversed, the same description and references will serve for either carriage. As above mentioned, they are connected by the cross-head 70 at their top edges to clear the several parts of the machine in this area. Thus, these carriages and cross-head form a unit and operate as such.

Links 72 (Figs. 1, 2 and 8), pivoted to either carriage at 73, connect at pins 74 to rocker arms 75, and said rocker arms are keyed to the extremities of the rock-shaft 76, which is supported in suitable bearings in the box structure 8 of the base 2 of the machine. The rock-shaft 76 extends transversely of the main cam shaft 6, which shaft 6 carries the main operating cam 77, keyed or otherwise secured thereto. Two cam tracks are formed in this cam 77 and the cam track 78, which controls the properly timed movement of the transfer carriage, guides a cam roller 79 rotatably mounted on one end of the rocker lever 80, which likewise is keyed to the rock shaft 76.

In the operation of the machine, the pusher 68 assumes the position, as indicated in Fig. 1, just forward of the peach C', which is about to be introduced into the fruit treating machine.

A centering pin 81, located in the operating head of the pusher 68, engages the tip end of the peach and serves to maintain the fruit in its predetermined position on the two impaling blades 60 and 34 during its further travel to the transfer position C'' (Fig. 8).

It is to be understood that as this machine is continuously operating that a peach has previously been carried through the machine to the pitting position C''' (Fig. 8), and it is during this transfer movement that the peach C' is carried along the impaling blades 60 and 34 to the position C'', which is the actual point of transfer.

To the upper frame structure of the machine are secured side rails 82 (Figs. 1, 2, 9, 11 and 12), which serve as guides for rollers 83, which in turn are mounted on the inner sides of either carriage 71. Additional rollers 84 also supported by either carriage engage the inner surfaces of the respective side rails, which may be of channel cross section, and serve to maintain the carriages in positive alignment during their travel, at the same time minimizing the friction developed in such continuous and rapid operation.

Bumpers 85 and 86, secured to the outside of the upper frame structure forwardly and rearwardly respectively, assist in absorbing shocks occurrent as wear develops in the several working parts of the mechanism. These bumpers preferably have resilient material inserted in their engaging faces and are respectively aligned with cooperating lugs or bumpers, which are integrally formed on the carriages 71.

The carriage 71 moves according to the design of the cam track 78 and its several interconnected operating elements above described. As the pusher 68, mounted on the rock-shaft 69, is supported in the cross-head 70, which in turn is supported by the carriages 71, the peach is thus taken from the loading unit in its predetermined position and placed at the transfer position C''.

The peach C'' is now in position to be received by additional transfer means, carried across the bisecting medium, each half thus formed subsequently pitted and discharged. The cycle then being complete and to be continuously repeated.

The method of bisecting, transferring, and pitting of the fruit is similar to the method employed in my aforesaid copending application, but having various improvements in the mechanisms thereof, as will hereinafter be described.

A fruit engaging means, movable along an axis angularly relating to the plane of the impaling blade 60, is employed to now transfer the peach across the bisecting medium, and the bisected peach halves thereafter, to the pitting position whereat the pits are removed by the pitting knives.

Figure 16:
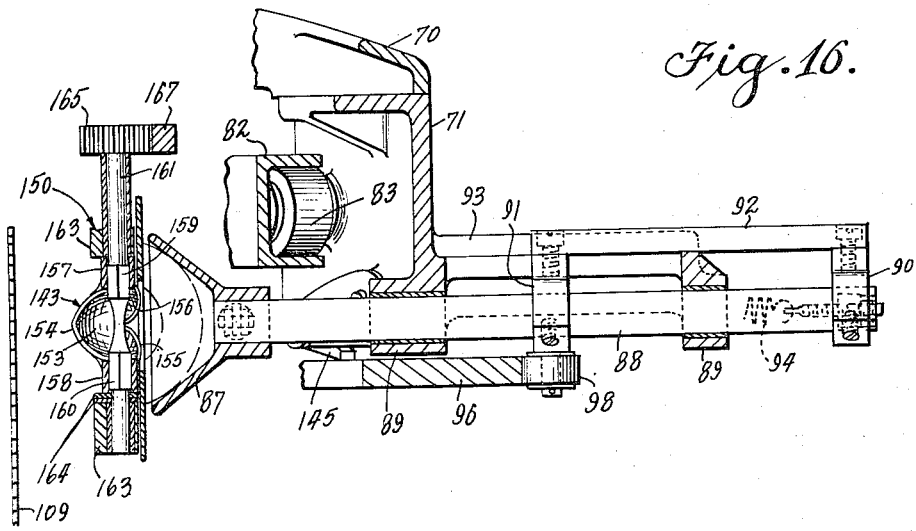
Fig. 16 is an enlarged detailed section through a portion of the cup carriage, illustrating one of the cups and its associated pitting knife, and taken on the line 16—16 of Fig. 9.
Figure 17:
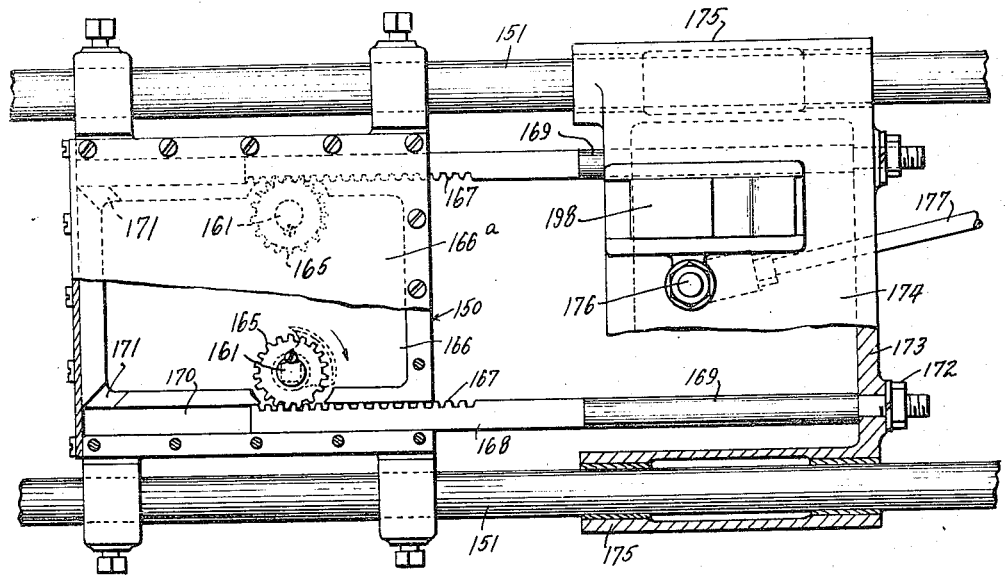
Fig. 17 is an enlarged plan view, partly broken away, of the pitting knife carriage and operating means.

Referring to Figs. 9, 15, and 16, it will be noted that this fruit engaging means comprises a pair of conical cups 87, one on either side of the impaling blade 60, to receive each side and subsequently each half of the peach. These cups, which are positioned at the proper height to centrally engage the peach, are secured to the inner extremities of the rods 88 which are reciprocably mounted in bearings 89 (Fig. 16) formed integral with their respective carriage members 71 and at an angle of approximately 26° to the plane of the impaling blade, or at any other suitable angle. This angle has proved most satisfactory in correctly aligning the peach halves in their proper position relative to the pitting knives and for the removal of their pits therefrom. However, a slight digression from this angle of 26° may not seriously affect the pitting operation.

Affixed to the rods 88 are spaced lugs 90 and 91 which support guide bars 92, slidably mounted in slots 93 of the carriages 71. This guide bar, being in axial alignment with the rod 88, serves to prevent said rod from rotating about its axis, thus maintaining the cups 87 in vertical alignment. Springs 94, of relative strong tension, connect to horizontal extensions of the outer lugs 90 and to the carriages 71 at their inner ends as indicated at 95 (Fig. 9), thus constantly tending to urge the rods 88 with their cups 87 into engagement with the fruit.

A pair of similar cam bars 96, one for either side of the machine and equidistant from the center thereof, are reciprocally mounted in guideways 97 spaced sufficiently above the base 2 of the machine to allow engagement with cam rollers 98 carried on the under side of the inner lugs 91, which are affixed to the rods 88. These cam bars 96 are kept in positive alignment during their reciprocable movement by a guide member 97a, which is secured to and spaced above the base 2 of the machine and guided in a slot 97b formed in the under side of either cam bar 96 and positioned intermediate of their extremities.

These cam bars 96 are arranged to travel first inwardly toward the center of the machine, thus to permit the fruit-engaging means, namely, the cups 87 mounted on their respective guide rods 88, to engage the impaled fruit at the proper moment, and, secondly, to travel outwardly at the completion of the pitting operation thus discharging the fruit.

The means for controlling the bars 96 comprises two sets of actuating arms or levers 99 and 100 (Fig. 11), respectively, which are secured below the forward portion of the base 2 of the machine to rock shafts 101. These rock shafts are supported in parallel alignment in said base 2 and are spaced equidistant from its longitudinal center thereof. One each of the arms 99 and 100 are secured near the forward ends of the shafts 101 and are connected by the tension spring 102 (Fig. 12). Each of the other arms 99 and 100 are secured rearwardly on the shafts 101 just forward of the housing 8 and in the same respective alignment with the forward pair of arms. The upper ends of these arms 99 and 100 terminate in elongated rounded heads 103, which engage the inner edges of the cam bars 96 forwardly and rearwardly thereof to insure positively aligned transverse movement of said bars.

Figure 11:
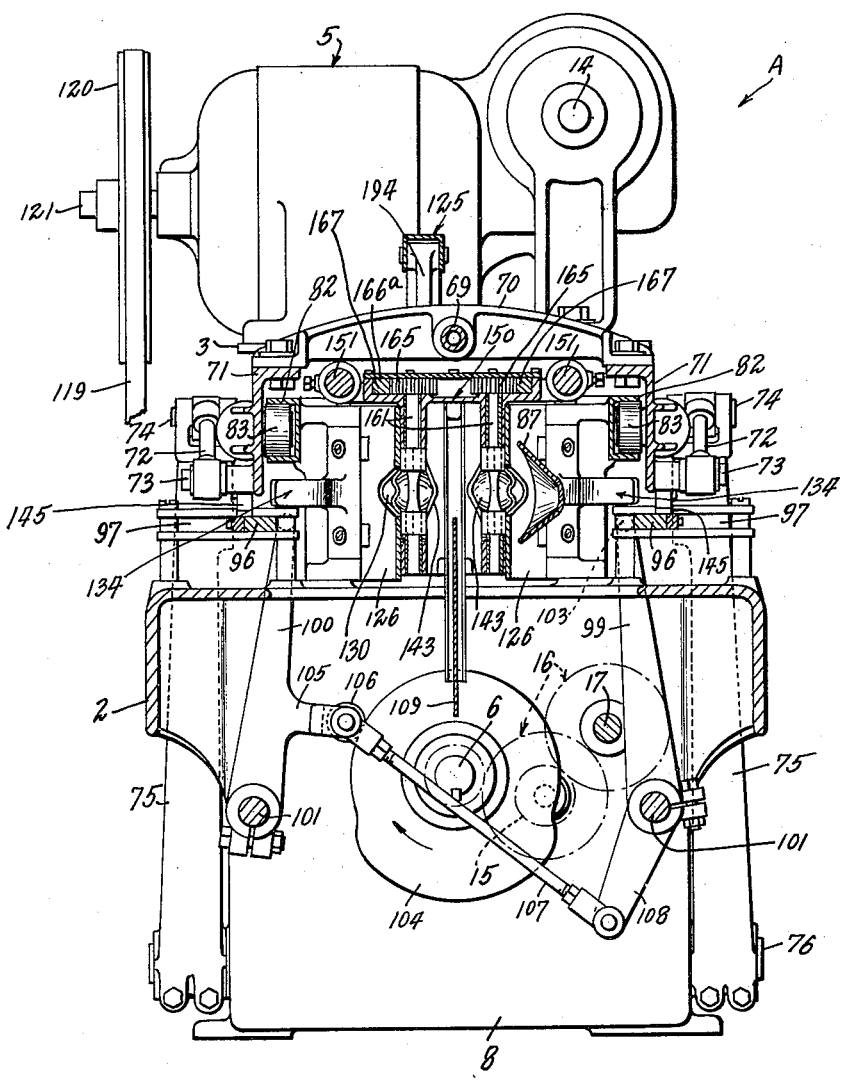
Fig. 11 is an enlarged vertical section taken substantially on the line 11—11 of Fig. 8.
Figure 12:
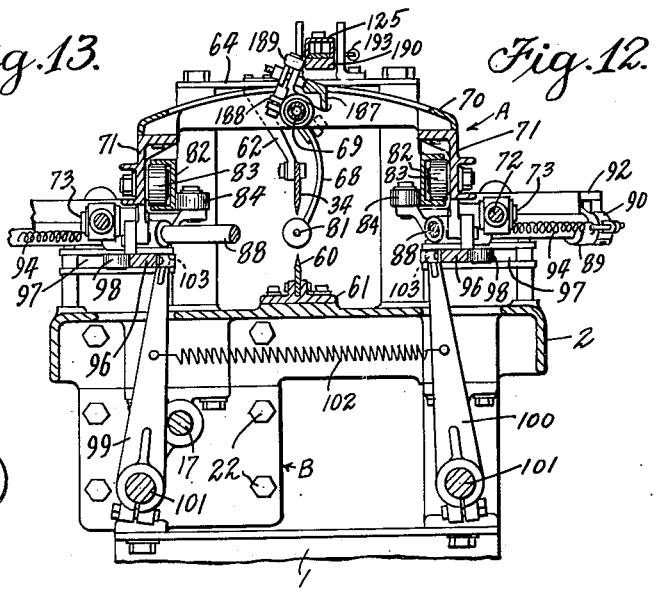
Fig. 12 is a vertical section looking in the opposite direction as in Fig. 11, and taken substantially on the line 12—12 of Fig. 1.

Secured to the inner extremities of the main shaft 6, preferably outside of the housing 8, is the guide bar lever control cam 104 (Fig. 11). An extension 105, formed integral with and intermediate of the ends of the left-hand guide bar actuating arm 100, rotatably supports a cam roller 106 which travels on the periphery of the cam 104. Pivotally connected to this rear actuating arm 100, on the cam roller stud, is an adjustable link 107, pivotally connected to an extension 108 of the right hand rear guide bar actuating arm 99. As the pivotal connections of the link 107 are equally spaced from their respective fulcrums 101, and are on either side thereof, equal and simultaneous movement of these dual sets of actuating arms and their respective cam bars 96 is assured; moving outwardly to discharge the fruit by virtue of the rise on the cam 104 in conjunction with the cam roller 106, and moving inwardly to engage the fruit by virtue of the tension spring 102, causing said cam roller 106 to conform to the low period on the cam 104.

The bisecting medium of this invention, as in the instance of my aforesaid copending application, comprises a rotary saw of about twelve inches in diameter, constructed of suitable material that is both heat and chemically resistant, and capable of being continuously rotated at very high speed. Said saw 109 is mounted centrally of the machine so that its plane is coincident with the plane of the impaling blades 34 and 60. It is supported on the inner end of a mandrel 110 which is preferably carried in anti-friction bearings contained within the integral bearing support 111 (Fig. 9) of the frame 2. The frame 2 of the machine has a large central opening 112 formed therein to permit the proper functioning of the saw, and the several discharge chutes for the peaches and their pits.

Secured to the outer extremity of the mandrel 110 is a V pulley 113, and said pulley is connected by the belt 114 to another V pulley 115, the pulley 115 being rotatably mounted on the stud shaft 116 supported by the bracket 117 which may be adjustably secured to the rear of the housing 8 and to its lefthand side thereof. Intermediate the ends of the stud shaft 116 is secured thereto another V pulley 118, and this is connected by the belt 119 to the V pulley 120 which is secured to the extreme left end of the motor shaft 121 of the power assembly 5.

The saw 109 is therefore driven directly from the motor by virtue of the intermediate pulleys and their respective connecting belts, and said saw is caused to rotate at very high speed and in a forward direction, thus entering the top of the peach which is held by the engaging cups 87.

Suitable cooling and rinsing means, such as the sprays of water, air or other liquid, directed onto and between teeth of the saw, may be employed as in the instance of my aforesaid copending application. These water lines are indicated at 122 in Fig. 1, and the spray points of contact at 123 and 124 respectively in Fig. 8. The sprays of water, or other liquid, thus striking the teeth of the saw, removes particles of the sawdust from the sawed pits, keeping the saw clean and preventing clogs of the sawdust from tearing the meat of the fruit. It also serves as a cooling medium for the saw blade which may develop considerable heat.

A means for rotating the pusher member 68 during its forward travel, generally indicated at 125 (Fig. 1) and which will shortly be more fully described, has previously been retracted so that the pusher 68 may travel rearwardly with its next succeeding peach, as the carriages 71 and the peach engaging cups 87 are transferring the fruit across the bisecting saw.

The cam track 78 of the cam 77, is so designed that the travel of the peach across the saw is relatively slow compared with the remainder of the rearward movement of the carriages 71 (see Fig. 21).

The foregoing paragraphs describe the several elements involved for the bisecting of the peach, and a brief résumé of this operation is as follows:

At the moment of the engagement of the peach C, the carriages 71 are in their maximum forward position, having been returned thereto by virtue of the parallel connecting links 72, rocker arms 75, rock shaft 76, rocker lever 80, and cam roller 79 traveling in the cam track 78 of the cam 77. This starting position is diagrammatically represented in Fig. 21, which illustrates the cam roller 79 as being at its 0 position in the cam track 78.

The cam bars 96 also have moved inwardly toward the center of the machine through the medium of the pressure of the cam rollers 98 mounted on the cup shafts 88 and the tension springs 94 affixed thereto, said rollers 95 bearing against the outer edges of the cam bars 96, together with the retraction of the dual sets of simultaneously operated actuating arms 99 and 100, controlled by the cam 104, which has now rotated so that the the cam roller 106, attached to one of the arms 100, travels on the low part of said cam 104. Thus it is these cam bars 96 that permit the engaging cups 87 to be spring-urged into engagement with the peach at this predetermined moment, and this is diagrammatically represented in Fig. 18.

The carriages 71 now move rearwardly, the engaging cups 87 holding the peach firmly in this pre-aligned position, carry the peach past the widened extremities of the impaling blades 60 and 34, thereby spreading the cut made by said blades to facilitate the entrance of the saw blade therein, and carry the peach across the teeth of the saw, thus completely bisecting the fruit. However, this movement is relatively slow, in order to insure clean separation of the peach halves and to prevent the meat from becoming damaged. Therefore, for the 70° rotation of the cam 77 during this period, the rise of the cam track 78 is correspondingly slight, thus transmitting similar movement to the carriages 71 by virtue of its aforesaid connecting mechanism. This movement is clearly illustrated in the diagram of the cam 77, Fig. 21.

The peach halves thus formed are now ready for their treatment, that is, to be pitted. Continued rearward movement of the carriages 71 transfers the peach halves across the pitting plates to the pitting position, where they are pitted, and subsequently discharged.

The mechanism for this sequence comprises a pair of self-aligning pitting plates, each having an orifice therein at the peach pitting position and said plates diverging at an angle to either side of the center line of the machine from a locality just to the rear of the front of the bisecting saw to a distance sufficiently rearward of the pitting position to accommodate pertinent parts of their controlling elements.

In the angular area thus formed between these pitting plates are mounted a pair of rotary pitting knives cooperating with the respective orifices in said plates and capable of entering said orifices to a predetermined depth during the rotation of said knives. Means for rotating the pitting knives comprises a reciprocating carriage slidably supported from the superstructure of the machine, said carriage provided with engaging means for the rotary knives, and said carriage operably controlled by the second cam track in the main cam 77 through the several connecting elements which will hereinafter be described.

Inasmuch as the respective pitting plates, their automatic aligning means and the rotary pitting knives are identical with respect to their dimensions and function, they only being reversed for left and right hand, a description for one of these pairs of elements will suffice, and the same reference characters apply to either group.

Referring particularly to Figs. 8, 9 and 15, it will be observed that the pitting plates 126 are of sufficient width to accommodate the respective halves of the peach after it has been bisected by the saw 109. These plates 126 are mounted vertically of the machine, one on either side of the bisecting saw 109, and each diverging rearwardly at an angle of approximately 15° from the plane of said saw, which coincides with the center line of the machine.

The forward ends of the pitting plates 126 are slidably supported in the brackets 61 and 65. The lower edges of said pitting plates being guided in slots 127, which are slightly wider than the pitting plates and formed in the bracket 61 which supports the rearward end of the impaling blade 60, and the upper edges of said plates being guided in complementary slots 128 in the upper bracket 65, which likewise supports the upper impaling blade 34.

The front mid-portion of the plates 126 is formed to a point 129 and beveled or otherwise shaped to conform to the face of the bisecting saw. This is to assist the transfer of the peach half as it passes across the saw to the outer surfaces of the pitting plates 126, said point 129 engaging between the face of the peach and the face of the saw, thus facilitating the transfer thereof as the peach carrying cups 87 continue their rearward movement by virtue of their respective carriages 71.

Rearwardly of the pitting plates at the predetermined pitting position are orifices 130 formed therein. These orifices are elongated in shape and have an arcuate forward edge for the purpose of cooperating with the spherical edge of the rotary pitting knives, and are tapered rearwardly to permit easy discharge of the removed pits.

The upstanding brackets 131 (Fig. 15) which support the side rails 82 at their rearward ends have offset ears 132 which support vertical shafts 133 upon which are fulcrumed the pitting plate aligning levers 134. The tail portion 135 of these levers are pivotally connected as at 136 to lugs 137 which may be adjustably secured to the respective pitting plates 126 rearwardly of their orifices. The forward leg 138 of the aligning levers 134 extends outwardly and into the path of a roller 139 adjustably mounted in a rearwardly extending boss 140 centrally located on the body portion of the carrying cups 87.

Tension springs 141, connected to the rearward ends of the plates 126 and the brackets 131, normally maintain said plates in their predetermined angular positions against the adjustable stops 142 secured to the brackets 131.

It has previously been mentioned that prior to feeding fruit to this machine, the peaches have been graded as to size, etc. However, one of the objects of this invention is to provide means for accommodating fruit of slightly varying dimensions, also variations in each half of the peach due to inaccuracy on the part of the operator in placing said fruit on the impaling blade 30. Therefore, it is by virtue of the aforesaid flexible mounting of the pitting plates 126 and their respective cooperating elements with relation to the carrying cups 87 that this self-aligning and automatic registering means is accomplished.

In the treatment of fruit, particularly the pitting of peaches in machines of this type, it becomes necessary to make a deeper cut with the pitting knives whenever a peach half of larger diameter is presented thereto, for the half pit of said peach is correspondingly larger. However, the location of said pits varies only slightly toward the blossom end of the peach and the variation of the mathematical distance from the rearward tip of the peach-pit to the surface of the fruit is relatively slight compared to the variations in length of the pits themselves.

In this machine, the rotary pitting knives 143 are so designed and positioned that they first pass through the orifices 130 in the pitting plates 126, and enter the face of the peach half between the rear extremity of its half pit and the surface of the fruit. The pitting knives shown in Figures 15, 19 and 20 rotate in a clockwise direction looking down on the machine, and leave the peach forward of its half pit and in approximate contact with the forward edge of the orifice in the pitting plate, thus establishing a shearing action between the edge of the knife and the edge of the orifice and preventing the tearing of the meat of the fruit.

In the event a larger peach half is presented at the pitting position, it becomes necessary that the rotary knife make a deeper cut therein and by shifting the pitting plate inwardly and forwardly, the pitting knife thus is permitted to accomplish this, inasmuch as its center of rotation remains constant.

In the operation of the machine, after the peach has been bisected by having been passed across the teeth of the saw, it continues its rearward travel until it reaches the pitting position, which occurs at the rearward limit of movement of the transfer carriage 71.

The cam bars 96 have symmetrically inclined edges 144 (Fig. 18) which are parallel to the angle of the respective pitting plates 126, and located so that as the carriages 71 continue their rearward movement they will cause the cam rollers 98 carried by the cup shafts 88 to move outwardly, thus retracting the shafts 88 against the action of the springs 94, and permitting the peach-carrying cups 87 and their respective peach halves to conform to this change in angularity due to the diverging pitting plates.

It is to be understood that the peach cups 87 are secured on the shafts 88 so that when they contain no fruit their edges are always a definite distance from the impaling blade 60, the saw 109, and the pitting plates 126, and are maintained in this relationship thereto throughout their rearward travel by virtue of the parallel faces of the cam bars 96 and the roller 98 which is at all times in contact with said cam faces. However, this spaced relationship between said fixed elements and the edges of the cups 87 is such that it is slightly less than the bulk of the fruit carried in the cups will permit, hence the fruit is maintained in contact with these elements 60, 109 and 126 by the action of the springs 94.

As the fruit leaves the face of the saw 109 and engages the respective faces of the pitting plates 126, it freely adjusts itself to this angular change by slipping around the inner conical faces of the cups and thus approximately centers the pits in axial alignment with the center of rotation of the pitting knives, so that it is in actual alignment with said knives at the time it reaches the pitting position.

In practice, it has been determined that the aforesaid angle of 26° in the instance of the fruit engaging means, combined with the approximate 15° angle of the pitting plates, locates the fruit in the most desirable position for the proper removal of the pits therefrom, but any other suitable angle may be used.

The orifice 130 is just large enough to permit the rotation of the pitting knife therein, and small enough to prevent any of the meat of the fruit from passing through said orifice.

Continued rearward movement of the carriages 71 eventually bring the carrying cups 87 with their respective peach halves to the orifice at the pitting position, at which place said carriages 71 are locked during the pitting operation. This is accomplished by the gravity latch 145 (Fig. 10 on Sheet 1) which is pivotally mounted as at 146 to the respective carriages 71 engaging a complementary latching lug 147 adjustably secured to the outer edge of the cam bar 96 and beyond the effective cam surface thereof.

The movement of the cups 87 during this period is clearly illustrated in the diagrammatic Figs. 18 and 19.

In the instance of a peach being of the preselected diameter, there will be no readjustment of the pitting plates 126, for the roller 139 (Fig. 15) affixed to the cups 87 will contact the arm 138 of the plate aligning levers 134 at a complementary curved section 148, its center being exactly the same outward distance from the surface of the plate 126 as is the center of the roller 139 when preadjusted for the normal diameter peach. However, should a slightly larger diameter peach half cause the carrying cups 87 to be retracted outwardly along its axis, then the roller 139 will have moved a corresponding distance out of its normal path and contact the leg 138 of the lever 134 at a distance remote from its center 133, thus rotating said lever, and due to its connection with the pitting plates at 136, shifting said plate inwardly and forwardly, thus automatically realigning said plate 126 to conform to the size of the peach half and coordinating with its respective pitting knife 143. The springs 141 return the plates 126 against the limit stops 142.

It will be seen that the respective pitting plates 126 function alike and simultaneously but independently as the case may be.

The peach halves are now ready to have their half pits removed therefrom, they being located at their respective proper positions opposite the orifices and their cooperating pitting knives, and positively maintained in this position while being pitted after which the fruit is discharged from the cups.

Pitting is accomplished by the employment of a pair of rotary pitting knives 143 adjustably mounted in a pitting frame 150 which is rigidly supported from the upper frame structure of the machine and positioned downwardly thereof centrally of the machine, and designed to support said pair of pitting knives opposite the orifices 130 in the pitting plates 126, and to house the mechanism for rotating the knives in timed relation with the introductory and transfer mechanisms (see Figs. 8, 9, 15, 16 and 17).

The pitting frame 150 (Figs. 1, 8, 11 and 17) is rigidly secured at its top to the longitudinally extending rods 151 which are supported at their forward ends by the angle cross member 65 rigidly connecting the side rails 82, and at its rearward end to angle brackets 152 (Figs. 1 and 8) secured to the under side of the motor support shelf 3.

The rotary pitting knives 143 are similar to those employed in my aforesaid copending application, and comprise a spheroidal body portion 153 (Fig. 16) having a forward tapered edge 154 and opposed arcuate rearwardly directed converging cutting edges 155 and 156 arranged to start the cutting action at the sides of the knife and progressing the cut as the knife rotates to its center position where the two cutting edges meet. In practice, this is advantageous because it exerts a compact force upon the fruit while it is being pitted, thus tending to hold together and make a clean cut around the pits, particularly if they be split-pits, or broken.

The respective pitting knives have upper and lower bearing lugs 157 and 158, a square hole being formed therein to receive the squared portions 159 and 160 of the pitting knife shafts 161. Midway of the squared portions 159 and 160 of the shafts 161, is a thinned out portion of the shaft, circular in cross-section, for the purpose of providing a maximum area between said shaft and the inner surfaces of the pitting knives in order to facilitate the removal of the pits therefrom in the event they become wedged or otherwise fail to immediately dislodge themselves due to the sticky particles of flesh of the fruit. This is accomplished particularly by the aid of the next succeeding pit pushing any previous pit past said shaft and into a pit discharge chute 162 (Fig. 1) which is conveniently located in the central area 112 of the machine and which may lead to a bin or conveyor belt (not shown).

The pitting knives 143 are thus positively secured to the knife shafts 161 by virtue of the squared portions and said shafts are rotatably supported in upper and lower bearings formed in the extensions 163 (Fig. 8) of the pitting knife frames 150, there being a recessed portion in said extensions 163 between the shaft bearings to provide clearance for the rotary knives 143.

The ends of the pitting knife shafts 161 are cylindrical in form to enable said shafts to perform their rotary function.

The overall length of the pitting knives, that is, from the top surface of the upper bearing 157 to the bottom surface of the lower bearing 158, is slightly less than the distance between the shaft bearings in the extensions 163 of the pitting knife frame 150. The purpose of this design is to permit vertical adjustment of the respective pitting knives 143 relative to the predetermined centers of the peach pits, and this adjustment is attained by the employment of shims 164 (Fig. 16) which may be inserted between either the upper or lower knife bearings and the pitting knife frame bearings, as the case may be.

It is to be understood that the pitting knives 143 may be reversed end for end, as it sometimes may be desirable that the tapering edges 154 of the knives enter the meat of the fruit first instead of the converging edges 155 and 156, depending upon the nature of the fruit to be pitted.

Rigidly secured to the respective upper ends of the knife shafts 161 are pinions 165, which are seated in the box portion 166 of the pitting knife frame 150. This box portion 166 is integral with said frame and bridges the downwardly depending extensions 163 near the top of the frame 150.

Racks 167 cut in the square inner ends 168 of rods 169 are guided in slots 170 in the box portion 166 and engage the teeth on the outsides of the respective pinions 165 to cause rotation of the pitting knives 143. The box structure is for the purpose of containing lubricant which has free access to the fluid slots 170 through milled passages 171. A cover 166ᵃ secured to the box portion 166 prevents displacement of the pinions 165 and serves to retain the lubricating medium within said box portion.

The rods 169 are rigidly secured by nuts 172 to a downwardly extending web 173 of a cross-head 174 slidably mounted in bearings 175 on the longitudinally extending rods 151 of the superstructure.

Figure 14:
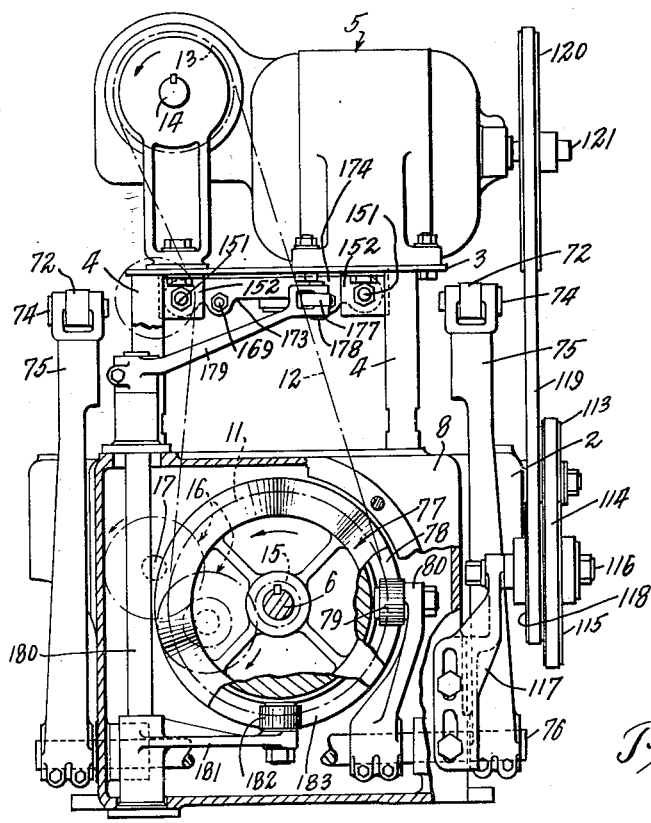
Fig. 14 is a rear elevation of the machine with its base portion broken away to disclose certain elements.

Pivotally secured as at 176 on the exact center line of the crosshead 174 is a link 177, being pivotally secured at its opposite end as at 178 (Figs. 1 and 2) to the pitting knife operating lever 179, said lever being keyed, or otherwise secured, to the upper end of the vertical shaft 180, which in turn is supported in suitable bearings in the housing 8 of the machine frame 2. Affixed by key or other method to the lower end of the vertical shaft 180 (Figs. 9 and 14) is the cam lever 181 which carries at its opposite end the rotatably mounted cam roller 182, the movement of which is controlled by the second cam track 183 formed in the main operating cam 77.

At the properly timed moment (see the cam diagram in Fig. 21) for the fruit to be pitted, the crosshead 174 which supports the rack-rods 169, is caused to travel forwardly of the machine by virtue of its connecting elements with the cam roller 182 to the cam track 183, thus causing the pitting knives to be rotated in a clockwise direction by the engagement of the pitting racks with their respective pinions, and by this rotation of said knives, the half pit is cleanly and completely freed from the meat of the peach half and falls by its own weight into the pit receiving chute 162.

At the completion of the pitting operation, the peach halves will be disengaged from the carrying cups 87 and drop into the discharge chutes 184 (Fig. 1) suitably positioned within the central opening 112 of the base casting 2 of the machine, one for each respective half of the peach, said chutes directed to convenient bins or conveyor means (not shown).

By referring particularly to Figs. 8, 9, 11 and 16, and the diagrammatic view in Fig. 20, it will be observed that as the cam shaft 6 continues its rotation in its cycle that the high point on the cam 104 (Fig. 11) secured on the inner end of cam shaft 6 will contact the cam roller 106 on the rearward cam bar lever 108 and, by virtue of the positive link connection 107 to the rearward cam bar lever 99, will cause the cam shafts 101 to rotate the respective cam bar levers 99 and 100 outwardly and thus, through their contact with the inner edges of the cam bars 96, force said cam bars apart and by their engagement with the cam rollers 98 secured to the cup carriage shafts 88 of the carriages 71, simultaneously retract said shafts 88 and the cups 87 against the action of the springs 94, whereupon the peach halves will be released from said cups 87 and drop into their respective discharge chutes 184.

It may be said as these cups are retracted that such suction as exists between the surfaces of the halved fruit and the surfaces of the respective pitting plates 126 will aid materially in the disengagement of the peach halves from the cups 87, such suction being sufficient to overcome any force that may tend to wedge the peach halves into the conical inner surfaces of the cups 87.

The fruit now having been fully and completely treated from the moment of its being impaled on the forward end of the impaling blade 30 by the operator and subsequently released from the carrying cups 87 after the removal of the pits therefrom, there remains only the return of the several transferring and operable elements to their starting positions to complete the cycle of operations.

As the cups 87 on their respective shafts 88 are retracted to release the pitted fruit, by virtue of the simultaneous outward movement of the cam bars 96, the carriage latching lugs 147 disengage themselves from the latch members 145 on the respective carriages 71 thereby again permitting free movement of said carriages.

The carriage cam roller 79 follows the return portion of its cam track 78 in the cam 77 during this period, and through its connecting elements 80, 76, 75 and 72, causes the carriages 71 to travel forwardly of the machine, hence returning said carriage unit to the extreme forward position. As the unit carriages 71 move forwardly, the cam rollers 98 of the cup shafts 88 follow the respectively inclined edges 144 of the cam bars 96, and are thus forced inwardly by the action of the springs 94 to the limit of their preadjusted movement.

When the unit carriages 71 have fully reached their forward limit of travel, the cam roller 106 of the rearward cam bar lever 100 finds its way to the low point of the cam 104 and as the connecting spring 102 causes simultaneous inward movement of the respective pairs of levers 99 and 100, the cam bars 96 are thus forced inwardly of the machine by virtue of the tension of the springs 94 acting through the cup carriage shafts 88 and the cam rollers 98 against the outer edges of said cam bars 96, whereupon the respective cups 87 engage the opposite sides of the next succeeding peach.

As the pusher member 68 must reposition itself forwardly of the next succeeding peach on the impaling blades 60 and 34 which is to be introduced into the fruit treating machine A, means are thereby provided for accomplishing this function.

In the foregoing paragraphs it was mentioned that the stud shaft 69 upon which the arcuate pusher member 68 is mounted, was rotatably supported in the bridging member 70 of the carriages 71. Affixed near the rearward end of said stud shaft 69 is a cylindrical collar 185 having a number of small radial holes drilled in its periphery, into which may be inserted one end of a torsion spring 186 which surrounds the stud shaft 69, the other end of said spring being looped under a downwardly depending portion 187 which is part of the connecting web of the bridge member 70, see Figs. 12 and 13.

Figure 13:
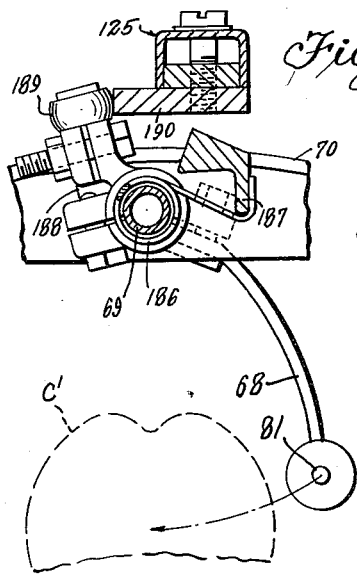
Fig. 13 is an enlarged view of a portion of Fig. 12 and illustrates the peach injecting element in its retracted position.

This torsion spring 186 is interposed between the aforesaid collar 185 and a cam roller supporting bracket 188 which is clamped to the stud shaft 69 near its mid portion and just rearwardly of the forward bearing of the bridging member 70. Rotatably mounted on the upper end of the support bracket 188 is a barrel shaped roller 189, and the adjusted angle and positioning of said roller and bracket is such that the roller 189 will be in the path of a flat cam plate 190 which is secured to the under side of the retractable member 125 (Figs. 8 and 13). This retractable member 125 is in the form of a longitudinally extending bar preferably of channel cross section for lightness, having a roller 191 supported at its forward end between the downwardly depending flanges of the member 125, said roller riding on the angular face of a forward cam member 192 affixed to the forward cross bar 64 of the superstructure of the machine. A tension spring 193, one end of which is secured to one side of the retractable member 125 and its other end to the cam casting 192, serves to constantly urge the member 125 in a forward and downward direction.

Pivotally secured to the rearward end of the retractable member 125 is a link 194 which likewise is pivotally connected as at 195 to a bracket 196 fastened near the forward edge of the motor support shelf 3. Midway of the link 194 on its forward side, there is pivotally supported a roller 197 which is so positioned as to ride on the upper surface of a cam block 198 rigidly secured to the pitting knife rod cross-head 174.

It is to be noted that the face of the forward cam block 192 is inclined forwardly, and that the face of the rearward cam block 198 is inclined rearwardly, and that the angle of both of said cam blocks is identical, preferably about 45°.

As the pitting knife rod cross-head travels in a forward direction during the pitting operation by virtue of its connecting elements to the cam track 183, the roller 197 of the link 194 rides down the rearwardly inclined slope of the cam block 198 thus causing the retracable member 125 to move forwardly and downwardly by virtue of its spring connection 193 in a substantially parallel manner due to the forward roller 191 engaging the forwardly inclined face of the forward cam block 192, thus lowering the cam plate 190 into the path of the barrel roller 198 on the rotary stud shaft 69 of the carriage bridging member 70.

When the moment arrives for the forward return of the cup carriages 71, the barrel roller 189 engages the outer right hand cam face of the cam plate 190 thus causing the stud shaft 69 to rotate against the action of the torsion spring 186 which action swings the arcuate pusher member to the left and out of the area occupied by the previously transferred peaches which are now in the mid area of the fruit treating machine A.

As the cup carriages reach their forward limit of travel, the barrel roller 189 is permitted to return to its normal position through the action of the torsion spring 186, thus rotating the stud shaft 69 and allowing the pusher to swing into its centrally aligned position to engage the forward side of the succeeding peach next to be introduced into the fruit treating machine A.

Inasmuch as the pitting knife rod cross-head 174 controls the action of the pusher member 68 it is obvious that the cam plate 190 is retracted out of the path of the roller 189 prior to the rearward movement of the carriages 71 in order to permit free introduction of the peach on the impaling blades 60 and 34 rearwardly of the machine for their subsequent treatment.

This rearward movement of the cross-head 174 occurs just prior to and during the rearward transfer movement of the carriages 71 and returns the rotary pitting knives 143 to their former position by rotating the respective pinions 165 in the reverse direction by virtue of the gear racks 167, and at the same time retracting said member 125 and the cam plate 190. By referring to the cam diagram in Fig. 21, this relationship of movement will be readily understood.

In practicing my invention it is to be understood that the proper size peach carrying cups, orifice plates, and pitting knives are to be assembled in the fruit treating unit A according to the selected size and grade of fruit which is to be treated in that particular unit. Also that the several connecting elements to the carriages 71, the cross-head 174, the cam bar levers 99 and 100 and the respective bumpers or shock absorber members are preferably adjustable as to their length and positioning, etc. The standard type of threaded rod, clevis and lock-nut being a satisfactory means to compensate for such variation as may be necessary in assembling a machine of this character.

In the operation of the fruit handling and treating machine illustrated and described herein, peaches which have previously been sorted and selected as to size and grade are placed within easy reach of the operator who assumes a position at the forward end of the loading unit B. A conveniently controlled switch sets the electric motor assembly 5 into operation thereby transmitting power to the units A and B in the manner above described.

The fruit is then successively impaled to the limit of its depth guide 31 on the impaling blade 30 of the loading unit B and near its forward end thereof, it being properly positioned with regard to the tips which are to be removed by the tipping knives 53, care being taken that the suture of the peach is as nearly as possible in the same plane as the impaling blade.

Henceforth the transfer and treatment of the fruit is entirely automatic.

The flights 32 convey the individual peaches along said impaling blade rearwardly toward the fruit treating unit A, their tips D being cut off by the wiping action of the knives 53 of the flights 32 as said flights reach their limit of rearward travel which leaves the peach on the extension 60 of the impaling blade 30 and in position to be engaged by the pusher 68, thence to be carried along the impaling blades 60 and 34 to a position just ahead of the bisecting saw 109.

The angularly disposed peach carrying cups 87 are "let down" gently at this moment by virtue of the cam bars 96, rollers 98, and springs 94, said cups 87 engaging the opposite sides of the peach and carry it across the bisecting saw 109 by virtue of the linkage connections 72, 75, and 80 between the carriages 71 and the cam roller 79 in the cam track 78 of the cam 77.

Continued rearward movement of the carriages 71 transfers the bisected fruit along the surfaces of the pitting plates 126 to a position opposite the orifices 130 in said pitting plates and the pressure of the peach halves against the action of the cup shaft springs 94 automatically and independently adjusts the respective plates inwardly and forwardly for the rotary pitting knives 143 to make the proper depth of cut to cleanly and completely remove the respective half pits. This automatic adjustment is determined by the cup engaging rollers 139 controlling the angular displacement of the levers 134 and their pivotally connected pitting plates 126.

The carriages 71 are respectively latched at the pitting position while the pitting knife cross-head 174 is brought into forward action through its linkage connections 177 to 181 inclusive with the cam roller 182 and cam track 183, and the pitting knives 143 are positively rotated by virtue of the rack and gear relation 165 and 167, thus cleanly, and completely removing the half pits from the respective peach halves.

Simultaneously with this forward movement of said pitting knife cross-head 174, the retractable cam support member 125 now projects its cam 190 into the path of the barrel roller 189 so that as the carriages 71 which are integral with the bridging member 70 are returned to their forward cup engaging position, said roller 189 will function to rotate the pusher shaft 69 and the pusher 68 out of line with the succeeding impaled peaches on the impaling blades 60 and 34.

At the completion of the pitting operation, the cup carrying shafts 88 are retracted so that their respective cups 87 release the pitted peach halves, permitting the fruit to be discharged into their respective chutes 184, and the removed pits into the central pit discharge chute 162.

This retracting action of the cups 87 and their respective shafts being caused by the cam 104 forcing the levers 99 and 100 against the cam bars 96 which contact the rollers 98 on the cup shafts 88, and at the same time releasing the carriage latching means 145, thus allowing said carriages 71 to return to their forward engaging position.

As the carriages 71 again travel rearwardly of the machine, the pitting knife cross-head 174 travels also to the rear thus re-rotating the pitting knives 143 to their normal position at the same time retracting the pusher control cam 190 out of the path of the barrel roller 189.

This cycle of operations is capable of being continuously repeated at the will of the operator.

Figs. 22, 23 and 24, diagrammatically illustrate a modified form of loader and introductory means which may be used in combination with the type of fruit treating machine above described.

This modified form of loader comprises an endless chain conveyor 251 corresponding to the conveyor 25 of the preferred type, above described, and is carried over equal pitch diameter sprockets 231 and 241 respectively, said sprockets being supported in a vertical plane relative to the fruit treating machine A instead of a horizontal plane as in the former instance.

By providing a vertical conveyor the loading unit B' may be positioned in closer proximity to the fruit engaging and transfer means 71—87 and the pusher 68 thereby dispensed with.

It is to be understood that this conveyor may be driven from any of the rotatable members associated with the transfer mechanism of the fruit treating unit A, and in proper timed relation thereto, although the particular method of accomplishing this is not shown in the diagrammatic views pertaining to this modification.

An impaling blade 301 is mounted on the supporting members of this modified type of loader, axially aligned with the center line of the fruit treating machine and corresponding in general to the impaling blade 30 heretofore mentioned.

A short impaling blade 601 may be substituted for the impaling blade 60 of the fruit treating unit A and terminating in a thickened end portion just ahead of the bisecting saw 109.

Flights 321 similar to the previously described flights 32 are provided as the means for transferring the fruit along the impaling blade 301, and are so spaced that they will present the successive fruit to the treating unit A, one for each cycle of said unit and in proper timed relation thereto.

The flights 321 comprise an upstanding member 441 and a base portion 381 which is connected to the continuous conveyor and travels in guideways formed by respective side rails 391 and 401. The base portion 381 may be relieved in its central area to accommodate the extended portions 361 of the several links of the conveyor 251, and said extended portions are pivotally connected to the base portions of the respective flights as at 351.

Means are provided to automatically remove the tip of the peach after it has traversed the limit of the impaling blade 301, at which time it is received in the carrying cups 87 at the initial transfer position of the fruit treating unit A. As in the former type of conveyor-loader, this tip removing means comprises a V shaped tipping knife 531 secured to the top of the upstanding portion 441 of the respective flights and extending over the impaling blade 301.

It will be observed that the lower guide rails 401 are curved downwardly at their rearward extremities to conform with the curvature of the pitch diameter of the sprocket 231. This is for the purpose of maintaining the flights in their upright position while the respective links to which they are attached are traveling around the sprocket 231.

In the operation of this modified form of loading and introductory means, the fruit is impaled on the blade 301 at the extreme forward end of the impaling blade exactly as described in the preferred type of loader, said fruit being conveyed along the impaling blade by the respective flights and positioned immediately ahead of the bisecting saw 109 thereby eliminating the necessity for the intermediate introducing means such as the previously described pusher member 68.

As the fruit reaches the rearward limit of the impaling blade 301 it is received by the carrying cups 87 and transferred to the short impaling blade 601. The travel of the carrying cups during this interval may be relatively slow in order to permit ample time for the "tipping" of the peach which takes place at this time.

It is desirable that the impaling blade 301 terminate a slight distance ahead of the short blade 601 to enable the flights to pass out of their plane of travel and around the sprocket, for it is this motion that produces the slicing action of the tipping knife 531, thereby cutting off the tip of the peach during the downward travel of the flights 321.

By pivoting the flights to the extensions 361 of the conveyor 251, they are permitted to flex with relation thereto, and by virtue of the curved extremities of the lower guide rails 401 cooperating with the base portions 381 of the flights, said flights maintain substantially an upright position while traveling forward and downwardly as they continue around the sprocket 231, and it is this wiping action against the rear side of the peach that automatically causes the tips to be cut off.

The flights continue around the respective sprockets as in the former instance and successively transfer and present the fruit directly to the fruit treating unit A, wherein the fruit is transferred by the carrying cups 87 across the bisecting saw 109 and the fruit halves subsequently pitted as has previously been described.

A peach holding medium such as the retractable pin 33 may be employed to prevent the rotation of the peach about the impaling blade 301 if so desired, and associated with the respective flights in a manner similar to that employed in the preferred type of loader, although this feature is not shown in the diagrammatic illustration of this modification.

It should be understood, however, that the fruit handling and treating machine herein depicted and described, is merely used to illustrate a preferred embodiment of the invention, and that modification of the structure and the rearrangement of certain parts of the machine may occur without departure from the spirit and scope of the appended claims.

I claim:

1. In a fruit treating machine, a fruit impaling and conveying blade onto one portion of which fruit to be treated is impaled, conveyor chain sprocket means, a conveyor chain carried upon said sprocket means, one or more fruit engaging and advancing flights pivotally mounted upon said chain, a tipping knife carried by each flight, and a cam rail for guiding the flights during the fruit conveying operation and arranged adjacent its discharge end for causing the flight tipping knife to traverse the engaged end of the fruit to thereby sever the tip therefrom.

2. In a fruit treating machine, a fruit impaling and conveying blade onto one portion of which fruit to be treated is impaled, conveyor chain sprocket means, a conveyor chain carried upon said sprocket means, one or more fruit engaging and advancing flights pivotally mounted upon said chain, a tipping knife carried by each flight, and a cam rail for guiding the flights during the fruit conveying operation and arranged to cooperate with one of said sprockets for causing the flight tipping knife to traverse the engaged end of the fruit to thereby sever the tip therefrom during the final portion of the conveying operation.

3. In a fruit treating machine, a fruit impaling and conveying blade onto one portion of which fruit to be treated is impaled, conveyor chain sprocket means, a conveyor chain carried upon said sprocket means, one or more fruit engaging and advancing flights pivotally mounted upon said chain, a tipping knife carried by each flight, an aligning pin carried by each flight and arranged to pierce and to thereby assist in maintaining the fruit in correct alignment during the conveying operation, means for retracting the aligning pin just prior to the final portion of the conveying operation, and means for guiding the flights during the fruit conveying operation and arranged to cooperate with one of said sprockets after the retraction of the aligning pin for causing the tipping knife to sever the tip from the fruit.

4. In a fruit treating machine, a fruit half conveying means adjustable to suit the size of each fruit half treated, an adjustable pitting plate having a pitting orifice, means for yieldingly maintaining said plate in position for the minimum size of fruit half to be treated, a pitting means operable through said orifice and arranged to pass in close shearing relation with one portion of the orifice during the final portion of the pitting operation, means carried by the conveying means having a different position for each different size of fruit half, and a pitting plate adjusting means actuated by said means carried by the conveyor as the conveyor moves the fruit half into pitting register for adjusting the pitting plate to suit the size of the conveyed fruit half and also operative during the adjustment of said plate for maintaining the close shearing relation between said one portion of the orifice and said knife.

5. In a fruit treating machine, an adjustable pitting plate having a pitting orifice, a link for swingably connecting one end of said plate with the machine frame, a stop means for determining the minimum setting of the plate, means for yieldingly holding the pitting plate against said stop, a pitting knife operable through the pitting orifice, a fruit half conveying means adjustable toward or from said plate according to the size of the fruit half to be treated and operable for moving the fruit half into pitting register, a cam connected with said link, and a cam actuating means carried by said conveying means arranged to engage and swing the cam and to thereby adjust the setting of the pitting plate to suit the size of the fruit half when the conveying means moves the engaged fruit half into pitting register.

6. In a fruit treating machine, a looped shaped pitting knife having a bored opening at each end thereof, and a shaft extending through the bored openings of said knife and arranged to drive the knife through a pitting operation and having that portion which extends between the inner surfaces of the knife openings of reduced diameter to facilitate the discharge of severed pits from between the loop of the knife and shaft.

7. In a fruit treating machine, a pitting knife having a body portion spheroidal in shape provided at opposite poles with bosses having aligned square holes, and a shaft having squared portions extending through the squared bosses of the knife for the operation thereof and having the section between the squared portions of reduced diameter to facilitate the discharge of severed pits from between the pitting knife and shaft.

8. In a fruit pitting mechanism, an orificed pitting plate mounted for both transverse and longitudinal movements, a pitting knife mounted independently of said plate and arranged to act through the orifice of said plate, means for registering bisected fruit halves with said orifice, and a control means operable during the registration of the fruit halves to move the pitting plate transversely to gauge the depth of pitting cut in proportion to the size of fruit half presented and to move said plate longitudinally to establish a shearing relation between said knife and orifice.

9. In a fruit pitting mechanism an orificed pitting plate, a pitting knife operable for acting through the orifice of said plate, means for mounting said plate and knife for relative movement in two directions, means for registering bisected fruit halves with the plate orifice, and a control means operable during the registration of the fruit halves for causing said relative movement between said plate and knife in said one direction to gauge the depth of pitting cut in proportion to the size of fruit half under treatment and to cause said relative movement in said other direction to establish a shearing relation between said knife and orifice.

PERCY JEPSON.